US006155287A

United States Patent [19]

Matarai et al.

[11] Patent Number: 6,155,287

[45] Date of Patent: Dec. 5, 2000

[54] FLUID PRESSURE CONTROL DEVICE WITH COVER FOR PREVENTING MISOPERATION

[75] Inventors: Yukihiro Matarai; Yoshio Aso; Makoto Ishikawa, all of Ibaraki, Japan

[73] Assignee: SMC Corporation, Tokyo, Japan

[21] Appl. No.: 09/497,146

[22] Filed: Feb. 3, 2000

[30] Foreign Application Priority Data

Mar. 31, 1999 [JP] Japan ........ 11-092389

[51] Int. Cl.[7] ........ F16L 35/00

[52] U.S. Cl. ........ 137/382; 137/884; 137/15.18; 251/114; 251/111; 251/90

[58] Field of Search ........ 251/90, 111, 114; 137/884, 382, 15.18

[56] References Cited

U.S. PATENT DOCUMENTS 5,127,440 7/1992 Maas et al. ........ 137/884
5,238,141 8/1993 Callegari et al. ........ 220/725
5,690,141 11/1997 Creaghe ........ 137/382
6,079,798 6/2000 Hosoya ........ 303/119.3

*Primary Examiner*—A. Michael Chambers
*Assistant Examiner*—Thomas L. McShane
*Attorney, Agent, or Firm*—Oblon, Spivak, McClelland, Maier & Neustadt, P.C.

[57] ABSTRACT

In a fluid pressure control device such as a solenoid-controlled valve having an operating piece for manual operation which is a selector-type operating piece, a cover for preventing misoperation is attached to the selector-type operating piece. Consequently, a cover 6 for preventing misoperation comprised of a base part 10 having an attaching part 14 to be fixed to the casing and a lid part 11 which is integrally connected with the base part 10 via a bending part 12 which can be bent and stretched is attached to a selector-type operating piece 5 having a handle 5*a* for manual operation at the top. By bending the bending part 12, the lid part 11 can be closed between a closed position covering the handle 5*a* and opened an open position to release the handle 5*a*.

8 Claims, 3 Drawing Sheets

FLUID PRESSURE CONTROL DEVICE WITH COVER FOR PREVENTING MISOPERATION

TECHNICAL FIELD

The present invention relates to a fluid pressure control device with a cover for preventing misoperation such that a cover for preventing misoperation is attached to an operating piece for manual operation in the fluid pressure control device.

PRIOR ART

For example, a solenoid-controlled valve for switching a passage of compressed air is usually provided with a manual operation mechanism having a push type operating piece so that the switching operation can be performed manually in the event of an emergency such as service interruption. The operating piece may be of a plunger-type having a simple rod shape, a selector-type having a handle for the operation at the top, a lock type which can be locked in an ON state by being turned by a predetermined angle while being pushed, a non-lock type which is locked in an ON state while being pushed by a hand and is returned to an OFF position by a spring force when the hand is moved off, or the like.

Among them, the operating piece of the selector-type is provided so as to be projected from the casing of the solenoid-controlled valve and is operated by the handle at the top. It has therefore an advantage of easy operation. On the contrary, it also has a drawback such that the operating piece is inadvertently pressed when the handle is touched by a foreign matter such as hand or tool during a work such as maintenance or adjustment and misoperation is easily caused.

In order to prevent such misoperation, it is necessary to take a measure of, for example, attaching a safety cover to the operating piece. Since the operating piece of the selector-type is generally larger than that of a plunger-type due to the existence of the handle, however, it is difficult to use a small cover of a simple construction and a cap shape with which the operating piece of the plunger-type is attached. A solenoid-controlled valve having a cover for preventing misoperation attached to a selector-type operating piece is therefore conventionally hardly known.

DISCLOSURE OF INVENTION

It is a main technical object of the invention to provide a fluid pressure control device such as a solenoid-controlled valve having an operating piece for a manual operation which is a selector-type operating piece with a handle, in which a cover for preventing misoperation is attached to the selector-type operating piece.

Another technical object of the invention is to provide a fluid pressure control device in which only a part covering the operating piece in a cover for preventing misoperation attached to a selector-type operating piece can be easily opened or closed as necessary in a state where the cover is attached to the fluid pressure control device without detaching or attaching the cover each time the operating piece is turned on or off.

In order to achieve the objects, according to the invention, a fluid pressure control device with a cover for preventing misoperation attached to a selector-type operating piece having a handle for operation at the top part is provided.

The cover includes a base part to be fixedly attached to the casing and a lid part which is integrally connected with the base part via a bending part which can be bent. The lid part can be closed/opened between a closed position to cover the handle of the operating piece and an open position of releasing the handle by bending/stretching the bending part, and the base part and the lid part are provided with retaining means comprising a projected part and a recessed part which are retained by each other when the lid part is in the closed position.

According to the invention with the construction, the cover attached to the operating piece prevents that the handle is touched by a hand, a tool, or the like. The operating piece is not inadvertently switched when the handle is pressed or turned, so that erroneous operation can be certainly prevented.

Since the base part of the cover is fixedly attached to the fluid pressure control device and, in such a state, the lid part is opened and closed, it is unnecessary to detach or attach the whole cover each time the handle is turned on or off. It is sufficient to open or close only the lid part covering the handle while the cover is remained to be attached to the fluid pressure control device, so that the cover is easily and efficiently used. Moreover, the retaining means is provided between the base part and the lid part and the lid part is held in the closed position by the retaining means when the lid part is in the closed position. Consequently, the lid part can be certainly held in the closed position with a simple construction without providing any retaining means such as a recessed or projected part to the fluid pressure control device and the operating piece.

According to a concrete embodiment of the invention, the operating piece can be locked in an ON state when the handle is turned by a predetermined angle, and the lid part of the cover is provided with a projection which comes into contact with the handle of the operating piece when the operating piece is in the locked position to prevent the lid part from being closed, enables the lid part to be closed when the operating piece is in a not-locked position, and regulates the turn of the handle by being retained by the handle.

Consequently, an inconvenience such that the cover is attached by mistake to the operating piece in the locked position and it is overlooked that the fluid pressure control device is in the manual operation mode can be certainly avoided. Moreover, an inconvenience such that the operating piece to which the cover is attached is turned and inadvertently switched to an operating position can be also certainly avoided.

According to another concrete embodiment of the invention, the casing of the fluid pressure control device includes a second casing part having the operating piece and a third casing part connected to the second casing part. The base part of the cover has an attaching part fixedly attached to the casing by being sandwiched between the second and third casing parts, a seating part for stabilizing the posture which comes into contact with and is retained by the top face of the second casing part, and side walls covering the right and left faces of the handle. The lid part of the cover has right and left side walls, and the projected parts and the recessed parts are provided at the side walls of the base part and the side walls of the lid part.

In this case, it is desirable that the attaching part is formed in a U shape and is fit to and retained by a U-shaped retaining groove formed on the junction face between the second casing part and the third casing part. Alternately, the attaching part is formed by an arm extending straight from the base part and a projection at the tip of the arm, and a groove and a dent to/by which the arm and the projection are fit/retained are formed on one of the junction faces of the second and third casing parts.

Thus, since the base part of the cover can be securely, firmly, and moreover, stably fixed to the fluid pressure control device so as not to be faltered and deviated, the lid part can be stably opened or closed.

DETAILED DESCRIPTION

Figure 1:
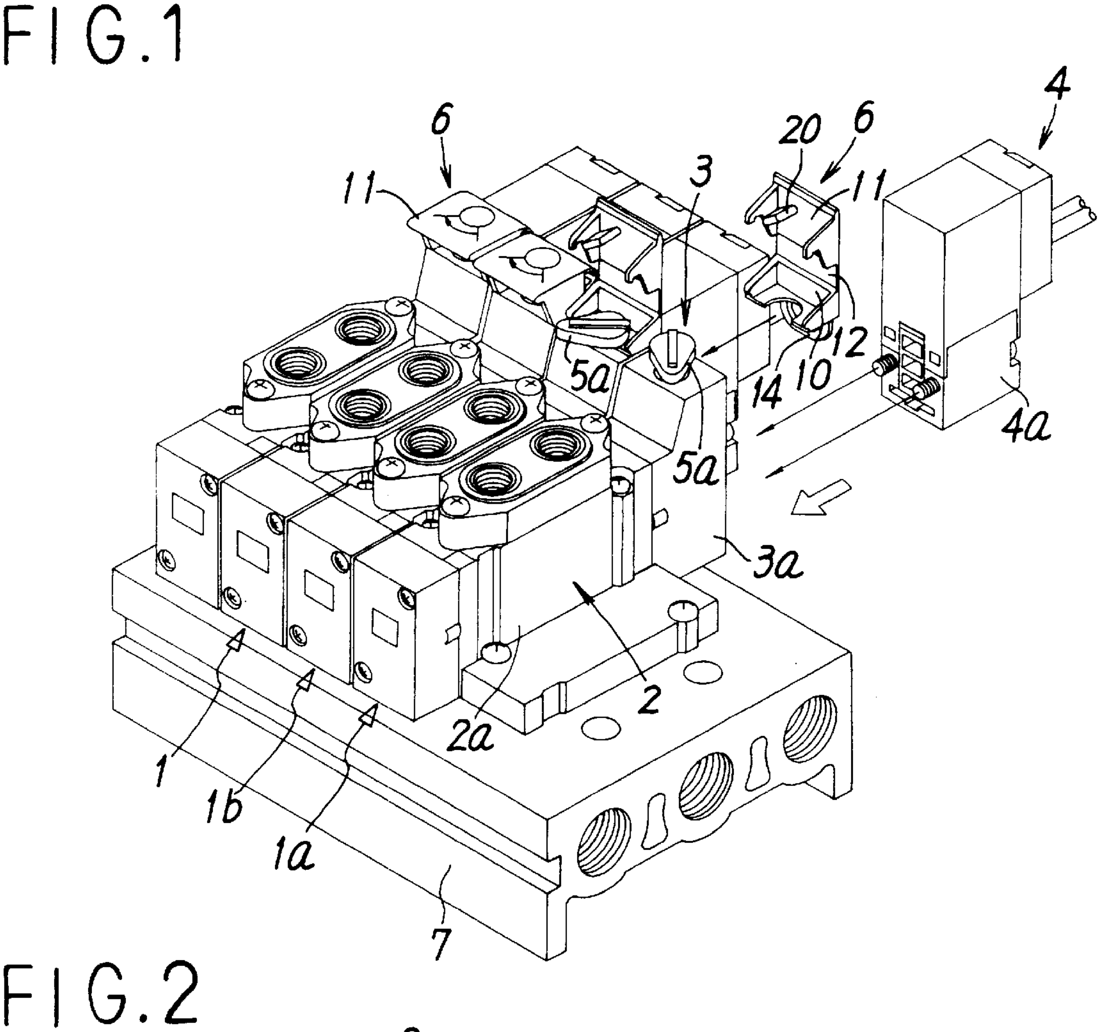
FIG. 1 is an exploded perspective view of a part of a first embodiment of the invention.

Some preferred embodiments of the invention will be described in detail herein below with reference to the drawings. FIG. 1 shows, as a fluid pressure control device having a manual operation mechanism, a solenoid-controlled pilot-operated directional control valve 1. The directional control valve 1 is of a single pilot type, in which a spool type valve member housed in a main valve unit 2 is switched by a single pilot valve 4 which is solenoid controlled. One manual operation mechanism 3 corresponding to the pilot valve 4 is provided between the main valve unit 2 and the pilot valve 4.

Figure 2:
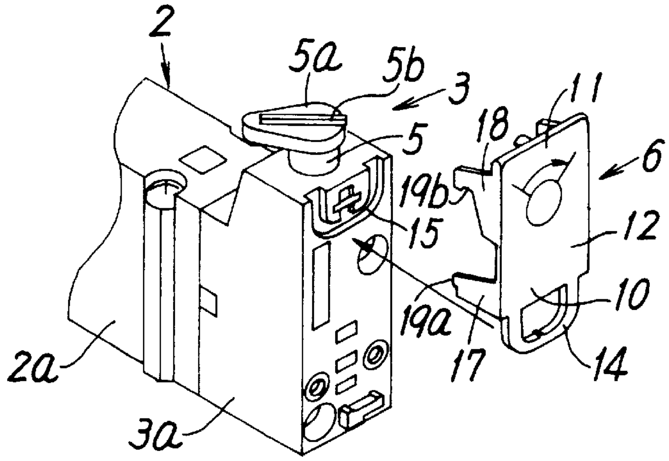
FIG. 2 is an exploded perspective view of the main part of FIG. 1.
Figure 3:
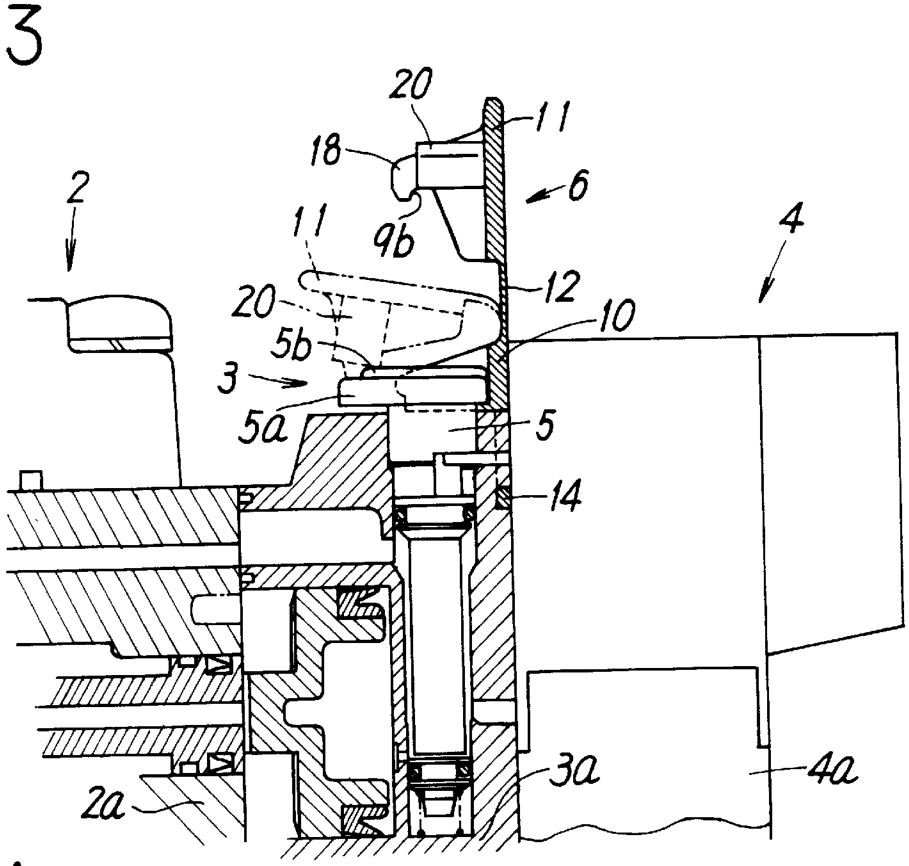
FIG. 3 is an enlarged cross section of the main part of FIG. 1.

As understood from FIGS. 2 and 3, the manual operation mechanism 3 is provided in a second casing part 3*a* forming a part of the casing of the directional control valve 1 and has an operating piece 5 which can be switched to an ON state by being pressed down and a cover 6 for preventing misoperation with which the operating piece 5 is covered.

The operating piece 5 is provided so as to project from the top face of the second casing part 3*a* and has an elongated handle 5*a* for operation horizontally extending from the top toward the main valve unit 2. By pushing and rotating the handle 5*a* by a predetermined angle, the operating piece 5 can be locked in an ON state. In FIG. 1, the operating piece 5 of a directional control valve 1*a* at the right end among four directional control valves 1 mounted on a subplate 7 is in an OFF position and the operating piece 5 of a directional control valve 1*b* which is the second from the right is locked in the ON position.

The casing of the directional control valve 1 includes a first casing part 2*a* having therein a valve member in the main valve unit 2, the second casing part 3*a* having the manual operation mechanism 3, and a third casing part 4*a* having therein the pilot valve mechanism. The parts 2*a*, 3*a*, and 4*a* are integrally coupled by screw means.

Since the other constructions of the main valve unit 2, the manual operation mechanism 3, and the pilot valve 4 in the directional control valve 1 are substantially the same as those of known ones and are not directly connected to the gist of the invention, their specific description is omitted here.

Figure 4:
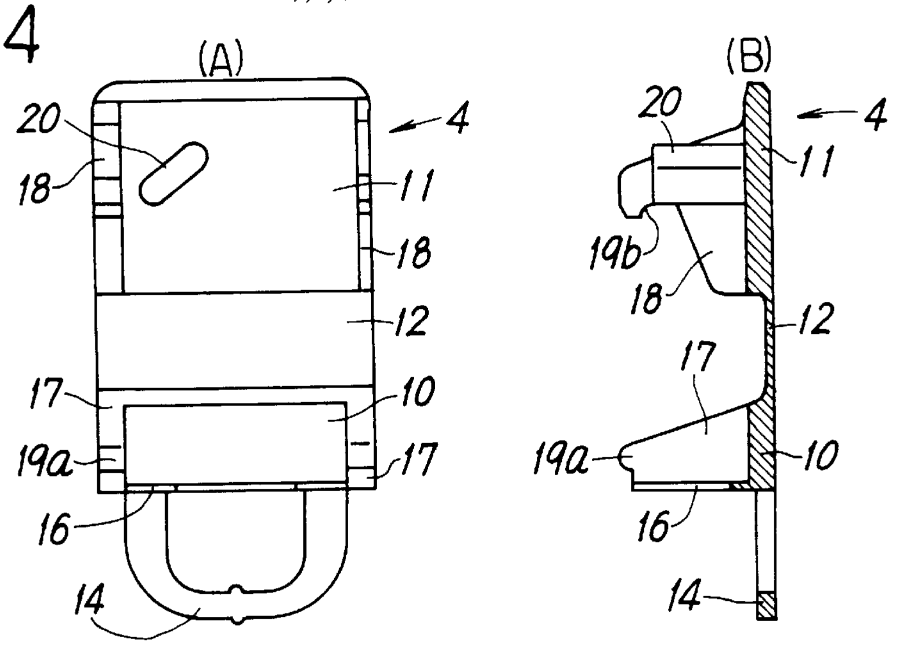
FIG. 4A is a front view of a cover and FIG. 4B is a longitudinal section of a cover.

As understood also from FIG. 4, the cover 6 is comprised of a base part 10 to be fixed to the casing and a lid part 11 extended from the base part 10 via a bending part 12 which is thinned to be bent. Those parts are integrally formed of a synthetic resin.

A U-shaped attaching part 14 is formed in the base part 10. The attaching part 14 is almost closely fit to and retained by a U-shaped retaining groove 15 formed on the junction face in the second casing part 3*a* with the third casing part 4*a*. By being sandwiched between the second casing part 3*a* and the third casing part 4*a* in such a state, the attaching part 14 is fixedly attached to the casing. The retaining groove 15 may be formed on the junction face on the third casing part 4*a* side.

In the base part 10, a seating part 16 for stabilizing the posture which comes in contact with and retained by the top face of the second casing part 3*a* in a state where it is fixedly attached to the casing and a pair of right and left side walls 17 and 17 covering the right and left side faces of the operating piece 5 are provided integrally.

On the other hand, the lid part 11 has the width and the depth capable of completely covering the top face of the handle 5*a*. The lid part 11 has a pair of side walls 18 and 18 covering the side faces of the handle 5*a* at the right and left edges. By bending/stretching the bending part 12, the lid part 11 can be closed in the closed position to cover the top and right and left side faces of the operating piece 5 or opened in the open position to release the operating piece 5. At the tips of the side walls 18 and 18 in the lid part 11 and the tips of the side walls 17 and 17 in the base part 10, retaining means comprised of projected parts 19*a* and recessed parts 19*b* which are retained by each other when the lid part 11 is in the closed position are provided. By the retaining means, the lid part 11 is stably held in the closed position.

Between the right and left side walls 18 and 18 in the lid part 11, a projection 20 is provided in a position deviated to one side. When the operating piece 5 is in the locked position, the projection 20 comes into contact with a retaining projection bar 5*b* on the top face of the handle 5*a* of the operating piece 5 as shown by a chain line in FIG. 3, thereby preventing the lid part 11 from being closed. When the operating piece 5 is in the not-locked position (off position), the projection 20 occupies a position deviated from the projection bar 5*b* to enable the lid part 11 to be closed and, simultaneously, is retained by the side faces of the projection bar 5*b* to regulate the rotation of the handle 5*a*.

Although the projection bar 5*b* is formed on the top face of the handle 5*a* and the projection 20 comes in contact with the top face of the handle 5*a* via the projection bar 5*b* and is retained by the side faces in the example of the diagram, it is also possible to make the projection 20 directly come into contact with the top face of the handle 5*a* and retained by the side faces without providing such a projection bar 5*b* on the top face of the handle 5*a*.

According to the directional control valve 1 having the configuration, the operating piece 5 is prevented from being touched by a foreign matter such as hand or tool by using the cover 6 attached to the operating piece 5. Consequently, the operating piece 5 is not inadvertently switched by being pushed or rotated and misoperation can be certainly prevented.

The base part 10 of the cover 6 is fixedly attached to the directional control valve 1 and only the lid part 11 is opened or closed in such a state. It is not therefore unnecessary to attach or detach the whole cover 6 to/from the directional control valve 1 each time the operating piece 5 is turned on or off. It is sufficient to open or close only the lid part 11 while remained to be attached to the directional control valve 1. The cover 6 is therefore very easily and efficiently used. Moreover, since the retaining means for retaining the base part 10 and the lid part 11 is provided therebetween and the lid part 11 is held in the closed position by the retaining means when the lid part 11 is in the closed position, the lid part 11 can be certainly held in the closed position with a simple construction without providing retaining means such as a recessed or projected part to the directional control valve 1 and the operating piece 5.

Further, the lid part 11 of the cover 6 is provided with the projection 20. When the operating piece 5 is in the locked position, the projection 20 comes into contact with the top face of the handle 5*a*, thereby preventing the lid part 11 from being closed. When the operating piece 5 is in the not-locked position, the projection 20 is deviated from the handle 5*a*, thereby enabling the lid part 11 to be closed. Simultaneously, the projection 20 is retained by the side faces of the handle 5*a* to regulate the rotation of the handle 5*a*. Consequently, an inconvenience such that the cover 11 is attached by mistake to the operating piece 5 in the locked position and a state in which the directional control valve 1 is in the manual operation mode is overlooked can be certainly avoided. Moreover, an inconvenience such that the operating piece 5 to which the cover 6 is attached is switched to an operating mode by an accident can be also certainly avoided.

Since the attaching part 14 provided for the base part 10 of the cover 6 is sandwiched and fixed so as to be retained between the second casing part 3*a* and the third casing part 4*a*, the cover 6 can be securely attached. Moreover, the base part 10 is provided with the seating part 16 for stabilizing posture which comes into contact with and is retained by the top face of the second casing part 3*a*, so that the cover 6 can be securely, firmly, and moreover, stably fixed to the directional control valve 1 so as not to be faltered and deviated. Thus, the lid part 11 can be stably opened or closed.

Figure 5:
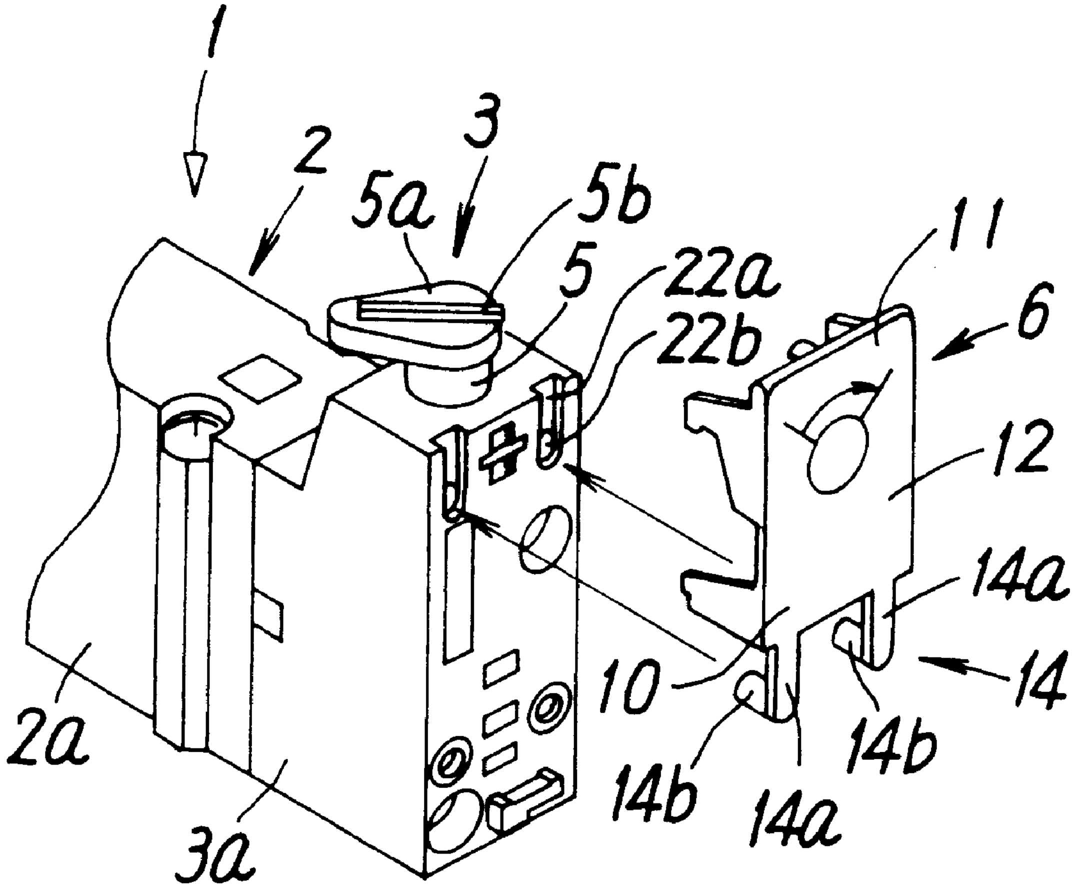
FIG. 5 is an exploded perspective view of the main part of a second embodiment of the invention.

FIG. 5 shows a second embodiment of the invention. The second embodiment is different from the foregoing first embodiment with respect to a mechanism for attaching the cover 6 to the casing of the directional control valve 1. Specifically, an attaching part 14 having two arms 14*a* extending straight and in parallel to each other from the base part 10 and projections 14*b* at the tips of the arms 14*a* is formed in the base part 10 of the cover 6. On the other hand, two sets each having a groove 22*a* and a dent 22*b* to/by which the arm 14*a* and the projection 14*b* are fit and retained are formed on the junction face of the second casing part 3*a* in the directional control valve 1. Since the construction except for the above is substantially the same as that of the first embodiment, the same reference numerals as those in the first embodiment are designated to the parts having the same constructions and their description is omitted here.

The number of the arms 14*a* may be one or three or more. The shape of the projection 14*b* is not limited to the cylindrical shape but is arbitrary.

In each of the embodiments, the single pilot type directional control valve 1 having one pilot valve 4 and one manual operation mechanism 3 is shown. A double pilot type directional control valve having two pilot valves and two manual operation mechanisms may be also used. In this case, a cover 6 as described above is attached to each of the two operating pieces.

Although the operating piece 5 is locked in the ON position by pushing and turning the handle 5*a* in each of the embodiments as shown in drawings, the operating piece 5 may be of a not-locked type which is in the ON state while being pushed by a hand and returns to the OFF position by a spring force when the hand releases it. In this case, since the handle is not turned, it is unnecessary to provide the cover 6 with the projection 20 for regulating the rotation of the handle or the projection bar 5*b* on the top face of the handle.

Further, the operating piece 5 does not always have to be of the press type. The invention can be applied to the operating piece 5 of a turn type for switching the ON/OFF state by being turned by a predetermined angle. In this case as well, in the manner similar to the foregoing embodiment, the operating piece 5 may be either the lock type which can be locked in the ON position or the not-locked type which cannot be locked.

Obviously, the invention can be applied not only to the directional control valve as described above but also a fluid pressure control device except for the directional control valve having a manual operation mechanism.

According to the invention, by using the cover attached to the operating piece, it can be certainly prevented that the hand, tool or the like touches the handle of the operating piece. Consequently, the operating piece is not inadvertently switched and misoperation is not therefore caused.

It is not therefore unnecessary to attach or detach the whole cover each time the operating piece is turned on or off. It is sufficient to open or close only the lid part covering the operating piece while remained to be attached to the fluid pressure control device, so that the cover is very easily and efficiently used. Moreover, since the retaining means is provided between the base part and the lid part and the lid part is held in the closed position by the retaining means when the lid part is in the closed position, the lid part can be certainly held in the closed position with a simple construction without providing retaining means such as a recessed or projected part to the fluid pressure control device or the operating piece.

What is claimed is:

1. A fluid pressure control device with a cover for preventing misoperation, comprising an operating piece for manual operation provided for a casing of the fluid pressure control device so as to be projected and a cover for preventing misoperation attached to the operating piece, wherein the operating piece has a handle for manual operation on its top, the cover includes a base part to be fixedly attached to the casing and a lid part extended from the base part via a bending part which can be bent, the lid part can be closed/opened between a closed position to cover the handle of the operating piece and an open position of releasing the handle by bending/stretching the bending part, and the base part and the lid part are provided with retaining means comprising a projected part and a recessed part which are retained by each other when the lid part is in the closed position.

2. The fluid pressure control device according to claim 1, wherein the operating piece can be locked in an ON state when the handle is turned by a predetermined angle, and the lid part of the cover is provided with a projection which comes into contact with the handle of the operating piece when the operating piece is in the locked position to prevent the lid part from being closed, enables the lid part to be closed when the operating piece is in a not-locked position, and regulates the turn of the handle by being retained by the handle.

3. The fluid pressure control device according to claim 1, wherein the casing of the fluid pressure control device has a second casing part having the operating piece and a third casing part connected to the second casing part, the base part of the cover has an attachment part fixed to the casing by being sandwiched between the second and third casing parts so as to be retained, a seating part for stabilizing the posture which comes into contact with and is retained by the top face of the second casing part, and side walls covering the right and left faces of the handle, the lid part of the cover has right and left side walls, and the projected part and the recessed part are provided at the side walls of the base part and the side walls of the lid part.

4. The fluid pressure control device according to claim 2, wherein the casing of the fluid pressure control device has a second casing part having the operating piece and a third casing part connected to the second casing part, the base part of the cover has an attachment part fixed to the casing by being sandwiched between the second and third casing parts so as to be retained, a seating part for stabilizing the posture which comes into contact with and is retained by the top face of the second casing part, and side walls covering the right and left faces of the handle, the lid part of the cover has right and left side walls, and the projected part and the recessed part are provided at the side walls of the base part and the side walls of the lid part.

5. The fluid pressure control device according to claim 3, wherein the attaching part of the cover is formed in a U shape and a U-shaped retaining groove to/by which the attaching part is fit/retained is formed on one of the junction faces of the second and third casing parts.

6. The fluid pressure control device according to claim 4, wherein the attaching part of the cover is formed in a U shape and a U-shaped retaining groove to/by which the attaching part is fit/retained is formed on one of the junction faces of the second and third casing parts.

7. The fluid pressure control device according to claim 3, wherein the attaching part of the cover is constructed by an arm extending straight from the base part and a projection at the tip of the arm, and a groove and a dent to/by which the arm and the projection are fit/retained are formed on one of the junction faces of the second and third casing parts.

8. The fluid pressure control device according to claim 4, wherein the attaching part of the cover is formed by an arm extending straight from the base part and a projection at the tip of the arm, and a groove and a dent to/by which the arm and the projection are fit/retained are formed on one of the junction faces of the second and third casing parts.

* * * * *